US011432629B1

(12) United States Patent
Giazzon

(10) Patent No.: US 11,432,629 B1
(45) Date of Patent: Sep. 6, 2022

(54) PROTECTIVE CASE FOR A LAPTOP COMPUTER

(71) Applicant: MAX Interactive, Inc., Costa Mesa, CA (US)

(72) Inventor: Albert George Giazzon, San Clemente, CA (US)

(73) Assignee: Max Interactive, Inc., Costa Mesa, CA (US)

(*) Notice: Subject to any disclaimer, the term of this patent is extended or adjusted under 35 U.S.C. 154(b) by 64 days.

(21) Appl. No.: 17/076,586

(22) Filed: Oct. 21, 2020

(51) Int. Cl.
| *A45C 11/00* | (2006.01) |
| *A45C 13/10* | (2006.01) |
| *G06F 1/16* | (2006.01) |
| *A45C 13/02* | (2006.01) |

(52) U.S. Cl.
CPC ............ *A45C 11/00* (2013.01); *A45C 13/02* (2013.01); *A45C 13/103* (2013.01); *G06F 1/1628* (2013.01); *A45C 2011/003* (2013.01); *A45C 2013/025* (2013.01)

(58) Field of Classification Search
CPC ........ A45C 2011/002; A45C 2011/003; A45C 2013/025; A45C 11/00; A45C 13/02; A45C 13/103; H04B 1/3888; G06F 1/1628
USPC .......................................................... 206/320
See application file for complete search history.

(56) References Cited

U.S. PATENT DOCUMENTS

| 6,264,029 | B1 | 7/2001 | Motson |
| 6,648,139 | B2 | 11/2003 | Fisher, Jr. et al. |
| 7,191,926 | B1 | 3/2007 | Costantino et al. |
| 7,778,026 | B2* | 8/2010 | Mitchell ............... G06F 1/1628 |
| | | | 224/648 |
| 8,817,467 | B2 | 8/2014 | Ore Yang et al. |
| 9,306,612 | B2 | 4/2016 | Forsythe |
| 9,591,905 | B2 | 3/2017 | Poon et al. |
| 10,499,719 | B2 | 12/2019 | Chan et al. |
| 10,759,353 | B2* | 9/2020 | Sezgin ................. H04B 1/3877 |
| 2005/0072691 | A1 | 4/2005 | Schlansky |
| 2007/0211415 | A1 | 9/2007 | Seo et al. |
| 2013/0213838 | A1 | 8/2013 | Tsai et al. |
| 2014/0061069 | A1 | 3/2014 | Westrup et al. |
| 2015/0157103 | A1 | 6/2015 | Simon |
| 2015/0241990 | A1 | 8/2015 | Mulhern |
| 2016/0161988 | A1 | 6/2016 | Reymond et al. |

* cited by examiner

*Primary Examiner* — Chun Hoi Cheung
(74) *Attorney, Agent, or Firm* — Eric Karich; Karich & Associates

(57) ABSTRACT

A protective case has a display case portion and a keyboard case portion hingedly coupled to the display case portion. An elongate vertical strap is mounted on an interior surface of the display case portion, and a tensional elastic strap is attached thereto. The tensional elastic strap has a first end attached to a first clip, and a second clip attached to a second end.

4 Claims, 2 Drawing Sheets

PROTECTIVE CASE FOR A LAPTOP COMPUTER

BACKGROUND OF THE INVENTION

Field of the Invention

This invention relates generally to protective covers, and more particularly to a protective case for a laptop computer.

Description of Related Art

The prior art teaches a wide range of protective cases for use with laptop computers such as laptop computers.

Chan, U.S. Ser. No. 10/499,719, teaches a case that includes an interior surface having a tensional retention assembly attached thereto. The assembly includes a tensional elastic strap, a first clip, and a second clip at first and second ends of the tensional elastic strap, the clips being adapted to hook around the edges of a screen portion of a device. The tensional elastic strap is held in place by a pair of straps attached to the interior surface of the case. The present invention teaches an improved retention system that does not include the pair of straps, but includes an improved system described below.

Other prior art systems include Costatino, U.S. Pat. No. 7,191,926, which teaches a case for a laptop computer that includes a flat base section of the carry case is secured to the keyboard section of the laptop with a pair of stretchable straps. A flat screen section of the carry case is secured to the monitor section of the laptop with stretchable straps secured between a pair of parallel strips.

Motson, U.S. Pat. No. 6,264,029, teaches a foldable folio organizer case that includes an adjustable clamp which may be used to grip a personal data assistant device (e.g., a PALM PILOT or similar). The clamp includes an upper bracket, a lower bracket, and an elastic member attached to the brackets, which is very similar to the elastic straps described. The personal data assistant may be gripped by the clamp by extending the upper bracket upwardly so that the device may rest on the lower bracket and against the case. The brackets are biased toward each other by the elastic member such that when the upper bracket is released, it grips the device and holds it in place. The brackets may be in a substantially hooked shape similar to the present invention.

The prior art teaches protective covers having at least one elastic strap. However, the prior art does not teach a protective cover having an elastic strap attached to the protective cover only at a middle of the elastic strap. The present invention fulfills these needs and provides further advantages as described in the following summary.

SUMMARY OF THE INVENTION

The present invention teaches certain benefits in construction and use which give rise to the objectives described below.

The present invention provides a protective case that includes a display case portion and a keyboard case portion hingedly coupled to the display case portion. An elongate vertical strap is mounted on an interior surface of the display case portion, and a tensional elastic strap is attached thereto. The tensional elastic strap has a first end attached to a first clip, and a second clip attached to a second end.

A primary objective of the present invention is to provide a protective case having advantages not taught by the prior art.

Another objective is to provide a protective case having a tensional retention assembly for retaining a laptop computer.

A further objective is to provide a protective case that may be used with varying sizes of a laptop computer.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a protective case for protecting and storing a laptop computer.

Figure 1:
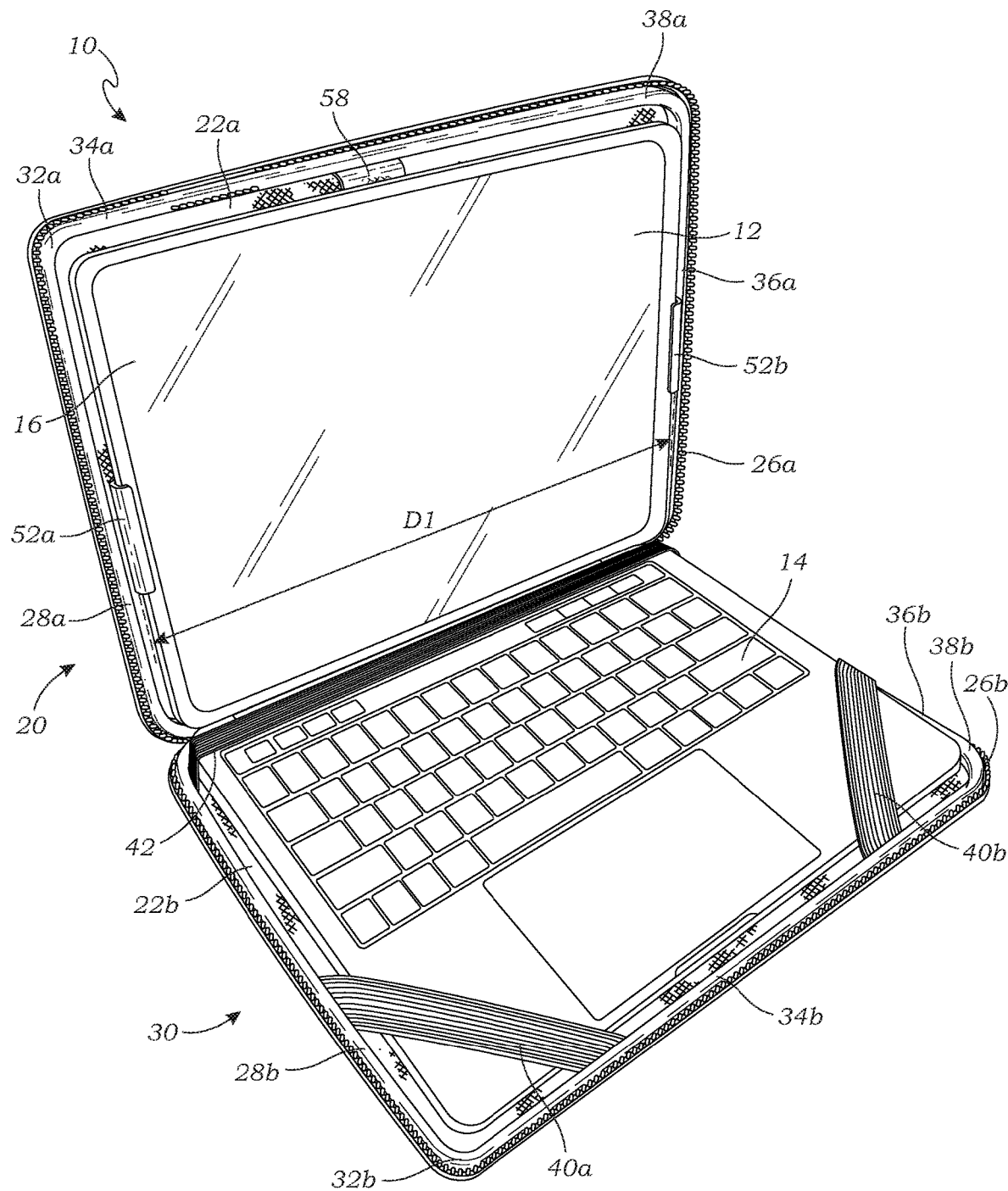
FIG. 1 is a perspective view of a protective case according to one embodiment of the present invention and showing a laptop computer within the case.

FIG. 1 is a perspective view of a protective case 10 according to one embodiment of the present invention, and showing a laptop computer 12 within the case 10. In FIG. 1, the portable device case 10 is shown in an open position and comprises a display case portion 20 having an interior surface 22a, and a keyboard case portion 30 having an interior surface 22b, with a flexible hinged portion 24 (shown in FIG. 2) positioned therebetween to allow for a hinged or axially oriented motion of the display case portion 20 and the keyboard case portion 30 relative to each other, between open and closed positions. As shown in FIG. 1, each interior surface 22a and 22b is bordered by the hinged portion 24 and, respectively, a zippered edge 26a and 26b, which includes left-side 28a and 28b, left-corner 32a and 32b, front-side 34a and 34b, right-side 36a and 36b, and right-corner 38a and 38b.

Affixed, joined, glued, stitched, as-one-piece, or otherwise extending from the left-side 28b, left-corner 32b, and front-side 34b of the keyboard case portion 30 is left-corner-holder material 40a, which is positioned above the interior surface 22b to allow for the corner of the laptop computer 12, such as the corner of a keyboard portion 14 of a laptop 12, to be slid therebetween. Affixed, joined, glued, stitched, as-one-piece, or otherwise extending from front-side, right-corner, and right-side of the keyboard case portion is right-corner-holder material 40b, which is positioned above the interior surface 22b to allow for another corner of the laptop computer to be slid therebetween. In some embodiments, an elongate lateral strap 42 may further be affixed, joined, glued, stitched, or otherwise extend from the left-side 28b left-corner 32b to the right-side 36b right-corner 38b of the keyboard case portion 30, wherein the elongate lateral strap 42 is positioned above the interior surface 22b to allow for a the keyboard portion 14 of the laptop 12 to be slid therebetween and pushed to the front-side 34b of the keyboard case portion 30.

Figure 2:
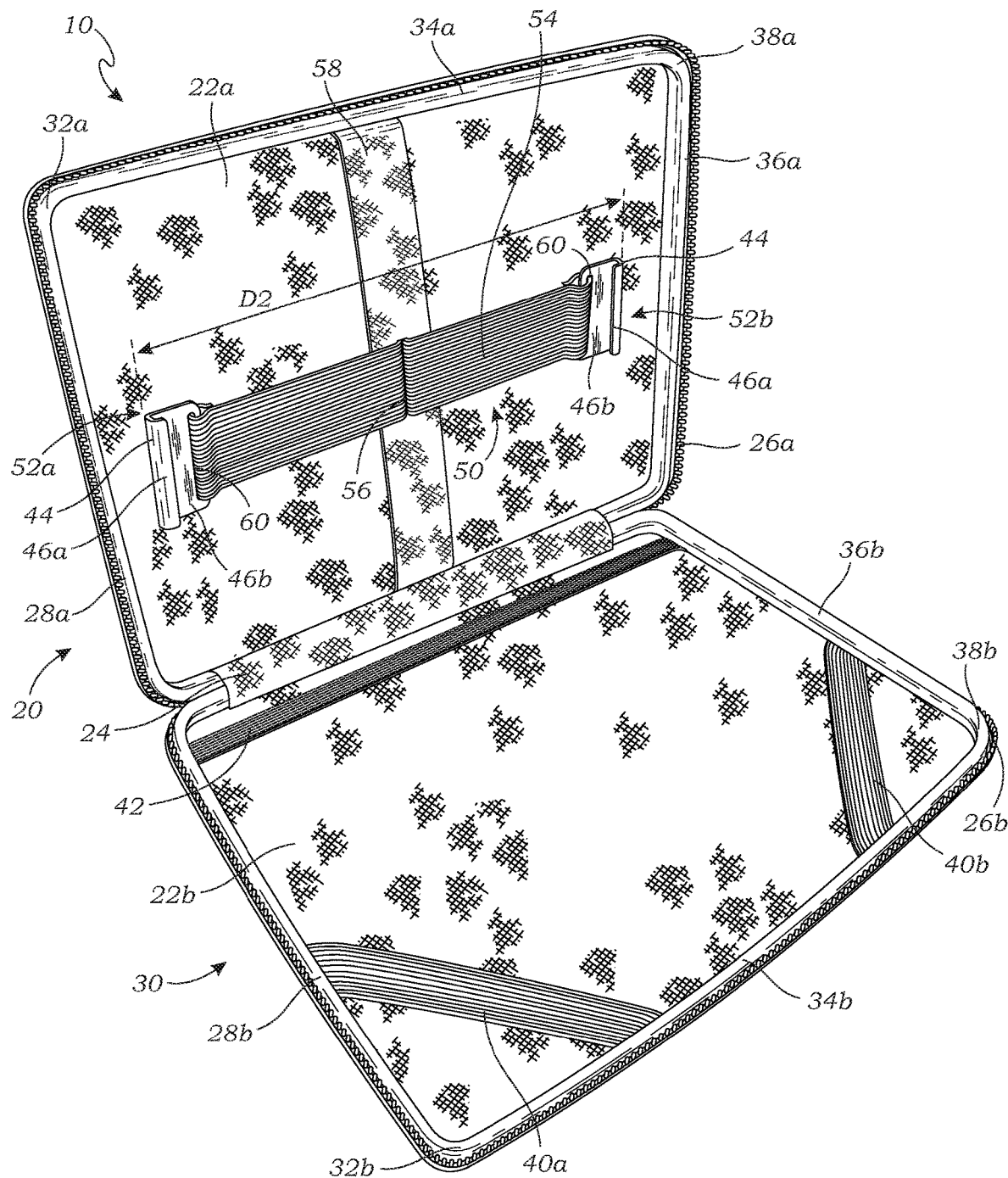
FIG. 2 is a perspective view of the protective case without the laptop computer.

FIG. 2 is a perspective view of the protective case 10 without the laptop computer 12. As shown in FIG. 2, the display case portion 20 further includes a tensional retention assembly 50 operably mounted on or adjacent the interior surface 22a. The tensional retention assembly 50 including a left channeled clip 52a and a right channeled clip 52b coupled on either end of a tensional elastic strap 54. The tensional elastic strap 54 may be in the form of an elastic strap or equivalent construction, and the channeled clips 52 may be any form of element that can be removably engaged with the edges of the laptop computer 12 (as shown in FIG. 1).

The tensional retention assembly 50 is shown in FIG. 1 with the tensional elastic strap 54 in an extended state with an extended length, D1, between the left channeled clip 52a and the right channeled clip 52b, wherein the tensional elastic strap 54 extends laterally outwardly to secure on either side of a screen portion 16 of the portable device 12, wherein an elastic material of the tensional elastic strap 54 biases the clips 52 inwardly. As such, tensional elastic strap 54 is capable of stretching, when applied forces are put on both of its ends in opposite directions, from a contracted length D2 (shown in FIG. 2) to the extended length D1 (shown in FIG. 1), which is longer than D2. This extended position typically exists when there is the laptop 12 being contained by portable device case 10.

The protective case 10 is shown containing an exemplary laptop computer 12 depicted as the exemplary laptop 12 with its display portion 16 held by tensional retention assembly 50 of case 10, its keyboard portion 14 being held between left-corner-holder material 40a and interior surface 22b of the keyboard display portion 30, and between right-corner-holder material 40b and interior surface 22b, and its hinged portion 18 resting upon hinged portion 24 of case 10.

When used together under tensional forces of tensional elastic strap 54, as tensional means, when stretched from its contracted length D2 (shown in FIG. 2) to its extended length D1, left channeled clip 52a and right channeled clip 52b can engage with display portion 16 of exemplary laptop 12 (or other rectangularly shaped portion of similar thickness of a laptop computer) to secure such display portion 16 within the interior of portable device case 10. Through use of its tensional elastic strap 54, tensional retention assembly can allow for various widths of laptop computers to be retained therewith. Furthermore, the left and right channeled clips 52 and the tensional elastic strap 54 can allow for ready replacement or removal from portable device case 10 if desired.

As shown in FIG. 2, a middle 56 of the tensional elastic strap 45 is attached to or held adjacent to the interior surface 22 of the display case portion 20, typically in about the middle of the display case portion 20. In this embodiment, the tensional elastic strap 45 is fixedly attached to a mounting strap 58, or other form of mounting structure, of the protective case 10. In this embodiment, the mounting strap 58 is in the form of an elongate vertical strap that extends from the front-side 34a to the hinged portion 24 of the display case portion 20.

The left and right channeled clips 52 are shown in greater detail in FIG. 2. The left and right channeled clips 52 can be made from polypropylene, other hard and bendable plastic, or other such material. The left channeled clip 52a and the right channeled clip 52b are depicted as each having a spine 44 with a first-side wall 46a and a second-side wall 46b extending therefrom, thereby forming a slot 48 sized to engage the laptop computer display 16. First-side wall 46a extends from spine 44 an extent dependent upon bezel width of the laptop computer display 16 involved (so as not to extend past a bezel of the display portion 16 of exemplary laptop 12 so as not to block any part of images being displayed by the display portion 16). Second-side wall 46b generally extends farther from spine 44 than first-side wall 46a, since second-side wall 46b may be positioned adjacent a back-non-display surface of the laptop computer display 16 involved (not shown), and also to allow for ample material to provide slot-holes 60 for tensional elastic strap 54 to be coupled therewith (e.g., with stitching, loops, etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A protective case comprising:
    a display case portion including an interior surface;
    a keyboard case portion hingedly coupled to the display case portion with a hinged portion;
    an elongate vertical strap having ends that are mounted to the display case portion, respectively, to a front side edge of the display case portion, and adjacent the hinged portion, respectively;
    a tensional elastic strap having a first end, a second end, and a middle, wherein the middle of the tensional elastic strap is fixedly attached to the elongate vertical strap;
    a first clip attached to the first end of the tensional elastic strap; and
    a second clip attached to the second end of the tensional elastic strap.

2. The protective case of claim 1, wherein the first and second clips each include a spine, a first wall, and a second wall, the first wall and the second wall extending from the spine thereby forming a slot.

3. The protective case of claim 2, wherein the slots of the first and second clips are adapted to removably engage opposite sides of a display of a laptop computer.

4. The protective case of claim 1, wherein the keyboard case portion further comprises an interior surface, a zippered edge, and a corner holder material, the zippered edge including a first side, a second side, and a corner therebetween, the corner holder material positioned above the interior surface and extending from the first side, second side, and the corner of the zippered edge.

* * * * *